United States Patent Office 3,235,519
Patented Feb. 15, 1966

3,235,519
SULFONYL SEMICARBAZIDES AS BLOWING AGENTS FOR POLYMERIC MATERIALS
Byron A. Hunter, Woodbridge, Conn., assignor to United States Rubber Company, New York, N.Y., a corporation of New Jersey
No Drawing. Original application Dec. 31, 1959, Ser. No. 863,129, now Patent No. 3,152,176, dated Oct. 6, 1964. Divided and this application Oct. 31, 1963, Ser. No. 320,523
2 Claims. (Cl. 260—2.5)

This invention relates to the production of gas-expanded products with a new class of chemical blowing agents denoted organic sulfonyl semicarbazides, and to certain of them as new chemicals.

The use of certain heat sensitive organic hydrazine compounds as blowing agents is known. U.S. Patent No. 2,626,933, dated January 27, 1953, to Friedrich Lober, Max Bogemann, and Richard Wegler, discloses the use of hydrazides of organic sulfonic acids for this purpose. Many of these are effective blowing agents but exhibit objectionable characteristics in certain applications. For example, benzene sulfonyl hydrazide decomposes smoothly in a polyvinyl chloride plastisol composition to produce a white, cellular product having a fine, uniform cell structure. Unfortunately, the expanded product exhibits a disagreeable thiophenolic odor which greatly restricts the utility of the product. p,p'-Oxy bis-(benzene sulfonyl hydrazide), on the other hand, produces a similarly expanded vinyl composition which does not exhibit an objectionable odor. This latter substance (U.S. Patent No. 2,552,065, dated May 8, 1951, to Dwight L. Schoene) has gained wide commercial use as a blowing agent in rubber and plastics. A limiting factor in the use of the material lies in the decomposition temperature (circa 150° C.) which is too low for many applications. In the case of so-called "high density polyethylenes," for example, mixing temperatures may reach the decomposition temperature of the blowing agent. Under these circumstances premature decomposition of the blowing agent may occur during the incorporation step and part of the blowing gas will be lost with attendant impairment of blowing efficiency. The solution to the difficulty lies in the discovery of blowing agents which remain in the undecomposed state at incorporation temperatures but decompose smoothly with the production of gas at higher expansion temperatures.

An object of the present invention is to produce heat sensitive nitrogen compounds which are stable at temperatures below 170° C., but which decompose to produce nitrogen gas at temperatures between 170° C. and 250° C. A further objective is to produce organic nitrogen-containing substances which can be successfully incorporated in rubber or plastic at normal mixing temperatures and which decompose controllably and smoothly at higher temperatures to release nitrogen as the principal gas and produce a cellular structure within the rubber or plastic. Another objective is to provide blowing agents which produce more gas per unit weight than presently available sulfonyl hydrazide compounds. A still further objective is to provide new organic nitrogen compounds which exhibit unique physical and chemical properties and which may find application in various fields of specialized interest.

I have discovered that organic sulfonyl hydrazides can be modified to produce a new class of blowing agents by interaction with cyanic acid. The compounds that are produced by this reaction can be properly described as organic sulfonyl semicarbazides. The reaction can be represented by the following equation:

$$RSO_2NHNH_2 + HOCN \rightarrow RSO_2NHNHCONH_2$$

where R is aliphatic or aromatic.

I have discovered that organic sulfonyl semicarbazides, like the parent sulfonyl hydrazides, decompose smoothly and controllably to produce nitrogen gas at elevated temperatures. Further, I have discovered that my sulfonyl semicarbazide compounds produce more gas per unit weight than the sulfonyl hydrazides from which they are derived. This is surprising in that the quantity of gas produced by the new compounds exceeds the amount normally to be expected as available nitrogen. I have discovered that carbon dioxide is produced in the decomposition of my semicarbazides as well as nitrogen gas.

I have also observed that my sulfonyl semicarbazide compounds possess greater heat stability than the parent sulfonyl hydrazides and can be heated to higher temperatures without danger of premature decomposition. Fortunately, the decomposition temperature of my preferred sulfonyl semicarbazides lie in a range which permit their application as practical blowing agents in so-called "high density" polyethylene and other plastics which are normally processed at relatively high temperatures. Additionally, preferred sulfonyl semicarbazides exhibit other advantages over the parent sulfonyl hydrazides. For example, the reaction of certain odor-forming sulfonyl hydrazides with cyanic acid produces blowing agents with greatly reduced odor characteristics.

Certain liquid type sulfonyl hydrazides are converted to nicely crystalline solids with unique properties when reacted with cyanic acid to form the sulfonyl semicarbazides.

I have discovered that either aromatic or aliphatic sulfonyl semicarbazides are useful as blowing agents for rubbers or plastics. The sulfonyl group is directly linked to the aromatic or aliphatic radicals, which are preferably hydrocarbon, including aralkyl, groups. One type of aromatic sulfonyl semicarbazide is represented by the formula $$R(SO_2NH \cdot NH \cdot CO \cdot NH_2)_n$$

where R is an unsubstituted or alkyl-substituted aromatic hydrocarbon radical, and $n$ is 2 or 3. Another desirable type of aromatic sulfonyl semicarbazide is represented by the formula $$X(C_6H_4SO_2NH \cdot NH \cdot CO \cdot NH_2)_2$$

where X is an oxygen, sulfur, sulfonyl, or methylene radical.

Examples of aromatic sulfonyl semicarbazides which can be used for the purpose of this invention include:

Benzene sulfonyl semicarbazide
p-Toluene sulfonyl semicarbazide
o-Toluene sulfonyl semicarbazide
Benzene-1,3-bis-(sulfonyl semicarbazide)
Toluene bis-(sulfonyl semicarbazide)
Xylene sulfonyl semicarbazide
Xylene bis-(sulfonyl semicarbazide)
Benzene tris-(sulfonyl semicarbazide)
Biphenylene bis-(sulfonyl semicarbazide)
Naphthalene sulfonyl semicarbazide
Naphthalene bis-(sulfonyl semicarbazide)
Naphthalene tris-(sulfonyl semicarbazide)
p,p'-Oxy bis-(benzene sulfonyl semicarbazide)
p,p'-Thio bis-(benzene sulfonyl semicarbazide)
p,p'-Methylene bis-(benzene sulfonyl semicarbazide)
p,p'-Sulfonyl bis-(benzene sulfonyl semicarbazide)

The above examples are merely illustrative of the aromatic sulfonyl semicarbazides which can be employed as blowing agents. I prefer to use those aromatic sulfonyl semicarbazides which are devoid of unnecessary substituents. I particularly prefer those compounds which are devoid of substituents containing nitrogen attached directly to the aromatic ring, as, for example, nitro, nitroso, amino, alkyl- and arylamino, acetamino. Such groups not only add unnecessary bulk to the compound but are liable to produce discoloration in the rubber or plastic into which they are introduced. The effect of unnecessary bulk is to diminish the efficiency of the compound as a blowing agent. In general, for optimum efficiency, the blowing agents of this invention which contain a maximum of 10 carbon atoms per sulfonyl semicarbazide group are preferred.

One type of aliphatic sulfonyl semicarbazide which can be used to produce a cellular structure in rubbers or plastics is represented by the formula $$R'(SO_2NH \cdot NH \cdot CO \cdot NH_2)_2$$

where R' is a bivalent unsubstituted aliphatic hydrocarbon radical. Illustrative of suitable aliphatic and aralkyl sulfonyl semicarbazides are:

Methane sulfonyl semicarbazide
Ethane sulfonyl semicarbazide
Propane sulfonyl semicarbazide
Isopropyl sulfonyl semicarbazide
Butane sulfonyl semicarbazide
Isobutyl sulfonyl semicarbazide
Pentane sulfonyl semicarbazide
Hexane sulfonyl semicarbazide
Octane sulfonyl semicarbazide
Dodecane sulfonyl semicarbazide
Octadecane sulfonyl semicarbazide
Cyclohexane sulfonyl semicarbazide
Ethane bis(sulfonyl semicarbazide)
Propane-1,2-bis-(sulfonyl semicarbazide)
Butane-1,4-bis-(sulfonyl semicarbazide)
Oxy bis-(ethane sulfonyl semicarbazide)
Thio bis-(ethane sulfonyl semicarbazide)
Alpha-toluene sulfonyl semicarbazide
Xylylene bis-(sulfonyl semicarbazide)

As previously stated, I have discovered that sulfonyl semicarbazides can be formed from the corresponding sulfonyl hydrazides by reaction with cyanic acid. The cyanic acid is conveniently obtained from an alkali cyanate such as sodium cyanate or potassium cyanate in the presence of acid. Organic sulfonyl semicarbazides may also be prepared by reacting an organic sulfonyl halide with semicarbazide, but this method involves a clostly less available semicarbazide salt. Illustrations of the application of these procedures are given in the examples.

I have found that sulfonyl hydrazides exhibit unique amphoteric properties. That is, they are capable of forming salts with both bases and acids. I have taken advantage of their basic nature in my improved process of producing sulfonyl semicarbazides by first forming an acid salt of the sulfonyl hydrazide and then reacting this salt with an alkali cyanate to produce the sulfonyl semicarbazide.

(1) $RSO_2NHNH_2 + HCl \rightarrow RSO_2NHNH_3Cl$ (2) $RSO_2NHNH_3Cl + NaOCN \rightarrow RSO_2NHNHCONH_2 + NaCl$ In the case of water-soluble sulfonyl hydrazide salts it is convenient to simply add an aqueous solution of an alkali cyanate (as sodium cyanate, for example) to an aqueous solution of the sulfonyl hydrazide salt. The resulting sulfonyl semicarbazide is insoluble in the aqueous medium and may be recovered by simple filtration. With less water-soluble sulfonyl hydrazide salts it may be advantageous to add a solubilizing agent such as an alcohol, dimethyl formamide, dioxane, etc. in order to bring the sulfonyl hydrazide salt into solution.

I have also discovered that sulfonyl semicarbazides exhibit acid properties in the presence of strong bases and are capable of forming water-soluble alkali metal salts. It is therefore possible to separate sulfonyl semicarbazides from impurities by bringing them into solution in alkali metal hydroxide solution and, after filtration from insoluble imprities, reprecipitating the sulfonyl semicarbazide in purified form by the addition of acid. Although a variety of acidulating agents may be used for the purpose I prefer to use mineral acids such as hydrochloric or sulfuric acid. Acetic acid has also been found to be an effective acidulating agent.

The following examples are given to illustrate the invention:

(A) BENZENE SULFONYL SEMICARBAZIDE (1) *From benzene sulfonyl hydrazide and cyanic acid.*—Benzene sulfonyl hydrazide (17.2 g.; 0.1 mole) was suspended in 100 cc. water and then treated with 8.2 cc. (0.1 mole) of concentrated hydrochloric acid. The crystalline sulfonyl hydrazide passed into solution. The solution was filtered from a small quantity of suspended matter and was then treated with a filtered solution prepared by adding 9.8 g. (0.15 mole) of sodium cyanate in 100 cc. of water. A crystalline precipitate formed immediately and a small amount of effervescence was observed. Finally, another 8.2 cc. of concentrated hydrochloric acid was added to the mixture to destroy excess sodium cyanate. The crystalline product was filtered off and washed well with water and finally with a small quantity of alcohol. After drying, the product weighed 17.0 g. (79% yield). This melted with gas evolution at 216° C. When recrystallized from acetic acid the substance decomposed at 218° C. The benzene sulfonyl hydrazide used as the starting product melted with some decomposition below 125° C. The odor of the decomposition products from the benzene sulfonyl semicarbazide was much less pronounced than the odor of the decomposing benzene sulfonyl hydrazide.

(2) *From benzene sulfonyl chloride and semicarbazide.*—A freshly prepared solution of semicarbazide was made by mixing a solution of 81 g. (1.0 mole) of potassium cyanate in 200 cc. of water with a solution of 81 g. (0.5 mole) of dihydrazine sulfate in 200 cc. of water. The semicarbazide solution thus prepared was filtered from a small quantity of suspended hydrazodicarbonamide.

The semicarbazide solution, prepared as described, was added dropwise to a stirred suspension of 176.6 g. (1.0 mole) of benzene sulfonyl chloride in 1-liter of water. After one-half of the semicarbazide solution had been added a solution of 53 g. (0.5 mole) of sodium carbonate in 200 cc. of water was added concurrently and at the same relative rate as the remaining semicarbazide solution. Finally, after both solutions had been added the reaction mixture was allowed to stand overnight. The crystalline product was filtered off, washed well with water and dried. Yield=156 g. (72%). The crude product melted with decomposition at 209° C. When recrystallized from acetic acid the decomposition point was 218° C.

| Analyses: | Percent |
|---|---|
| Nitrogen calculated | 19.5 |
| Nitrogen found | 19.38 |
| Sulfur calculated | 14.8 |
| Sulfur found | 14.64 |

(B) p-TOLUENE SULFONYL SEMICARBAZIDE 162 g. (2.0 moles) of potassium cyanate in 500 cc. of water was added to 162 g. (1.0 mole) of dihydrazine sulfate in 500 cc. of water. The mixture was filtered from a small precipitate of hydrazodicarbonamide. The semicarbazide solution thus prepared was added gradually to a suspension of 381 g. (2.0 moles) of p-toluene sulfonyl chloride in 500 cc. of water. The last half of the semicarbazide solution was added at the same rate and simultaneously with a solution of 106 g. (1.0 mole) of sodium carbonate in 500 cc. of water. The mixture was stirred overnight. Then 50 cc. of concentrated hydrochloric acid was added and the mixture stirred for an additional hour. The product was filtered off, washed and dried. Yield was 305 g. This decomposed at 205° C. 50 g. of the crude product was treated with 100 cc. of 6 normal sodium hydroxide solution and the dissolved product was filtered from a small quantity of insolubles. The filtrate was carefully acidified with dilute sulfuric acid and the precipitate was filtered off, washed well with water and dried. The resulting solid was reslurried in acetone, allowed to stand one hour and was then filtered and washed well with acetone and dried. Yield=25 g. of pure p-toluene sulfonyl semicarbazide which decomposed at 236° C.

Analyses:

| | Percent |
|---|---|
| Nitrogen calculated | 18.3 |
| Nitrogen found | 18.31 |
| Sulfur calculated | 13.9 |
| Sulfur found | 12.7 |

(C) METHANE SULFONYL SEMICARBAZIDE 45.6 g. of methane sulfonyl chloride was added to a filtered solution of semicarbazide, freshly prepared by adding a solution of 35.2 g. of potassium cyanate in 100 cc. of water to a solution of 32 g. of dihydrazine sulfate in 100 cc. of water. Sodium carbonate (50 g.) was then added to the mix and it was allowed to stand four hours. Sufficient acetic acid was then added to neutralize. After standing an additional two hours the separated white crystals were filtered off, washed well with water and dried. Yield=19.0 g. This product (methane sulfonyl semicarbazide) decomposed to produce gas when heated to 194° C.

Analyses:

| | Percent |
|---|---|
| Nitrogen calculated | 27.4 |
| Nitrogen found | 27.0 |
| Sulfur calculated | 20.9 |
| Sulfur found | 20.5 |

(D) ETHANE SULFONYL SEMICARBAZIDE 64.2 g. (0.5 mole) of ethane sulfonyl chloride was dropped into a stirred solution of 35 g. (1.1 moles) of hydrazine in 150 cc. of water. The temperature was not allowed to rise above 40° C. After stirring for one hour 106 g. of concentrated hydrochloric acid was added. Then a solution of 133 g. (1.65 moles) of potassium cyanate in 175 cc. of water was added to the acid solution. After stirring for an additional hour the mixture was acidified with hydrochloric acid to destroy excess potassium cyanate. The solid precipitate was filtered off. The filter cake was then treated with sodium hydroxide solution and the insoluble residue (hydrazodicarbonamide) was filtered off (46 g. when washed and dried). The filtrate was concentrated to one-half its volume (under vacuum) and was then chilled in an ice bath. The resulting precipitate was filtered off and recrystallized from water. The yield of white crystalline ethane sulfonyl semicarbazide was 18 grams. This melted at 149–151° C. and decomposed with gas evolution at 156° C.

Analyses:

| | Percent |
|---|---|
| Nitrogen calculated | 25.15 |
| Nitrogen found | 25.1 |
| Sulfur calculated | 19.16 |
| Sulfur found | 18.10 |

(E) BUTANE SULFONYL SEMICARBAZIDE

Three-fourths mole (117.3 g.) of n-butane sulfonyl chloride was added gradually to a mixture of 1.65 moles (53 g.) of hydrazine in 100 cc. of alcohol and 300 cc. of water. After stirring for one hour 1.5 moles (146 g.) concentrated hydrochloric acid was added. Then a solution of 202 g. (2.5 moles) of potassium cyanate in 300 cc. of water was added. The mixture was stirred for one hour and then treated with additional hydrochloric acid to destroy any unreacted potassium cyanate. After chilling at 5° C. the mixture was filtered. The filter cake was then extracted with 6 normal sodium hydroxide solution to dissolve out the butane sulfonyl semicarbazide from the insoluble hydrazodicarbonamide. The caustic extract was then acidified with hydrochloric acid whereupon the white crystalline butane sulfonyl semicarbazide precipitated. This was filtered off and dried. Yield=65 grams. This was purified by recrystallization from water (yield= 56 grams). The white plates melted with decomposition at 188° C.

Analyses:

| | Percent |
|---|---|
| Nitrogen calculated | 21.54 |
| Nitrogen found | 21.5 |
| Sulfur calculated | 16.4 |
| Sulfur found | 15.34 |

(F) p,p'-OXY BIS-(BENZENE SULFONYL SEMICARBAZIDE 358 g. of p,p'-oxybis (benzene sulfonyl hydrazide) was dissolved with stirring (stirring was continued throughout this preparation) in a solution containing 334 cc. (2 moles) of 6 normal hydrochloric acid, 200 cc. of water, and 300 cc. of ethanol. The mix was warmed to 50–55° C. to complete the solution and was then filtered from a small quantity of insolubles. 300 cc. more of ethanol was added, and the mixture was cooled to 30° C. Then, 138 g. (1.7 moles) of dry potassium cyanate was added to the solution at the rate of about 2 grams per minute. The reaction mixture was observed to produce an alkaline reaction after the 138 g. of potassium cyanate had been added. At this point, 28 cc. (0.4 mole) of concentrated hydrochloric acid was added. Following this, 29 grams of potassium cyanate was added in three parts, a short time being allowed between additions. Then, 10 cc. portions of concentrated hydrochloric acid followed by 8 grams of potassium cyanate were added alternately every five minutes, bringing the pH to 4–5 at the end of each step. These additions were made until a total of 260 grams (3.2 moles or 60% excess) of potassium cyanate had been used. The mixture was allowed to stir for an additional thirty minutes, and the solid product was separated by filtration. After thorough washing with water and drying overnight in a 60° C. oven, 413 g. (93% yield) of p,p'-oxybis-(benzene sulfonyl semicarbazide) was obtained. The crude material melted with decomposition at 213° C. A portion was purified by dissolving in an excess of ammonium hydroxide solution and pouring the filtered ammoniacal solution into a mixture of dilute hydrochloric acid and ethanol. The crystalline product so obtained melted with decomposition at 219° C.

Analyses:

| | Percent |
|---|---|
| S calculated | 14.40 |
| S found | 14.38 |
| N calculated | 18.9 |
| N found (Dumas) | 18.06 |

(G) BUTANE-1,4-BIS-(SULFONYL SEMICARBAZIDE 127.5 g. of butane-1,4-disulfonyl chloride (0.5 mole) was added gradually to a solution of 136 g. (excess) of hydrazine in 100 cc. of alcohol. The reaction mixture was stirred one hour, diluted with water and filtered. The yield of butane-1,4-disulfonyl hydrazide was 104 g. (melts with decomposition at 154–156° C.).

21.8 g. of butane-1,4-disulfonyl hydrazide (0.1 mole) was suspended in 10 cc. of water and then treated with 16 cc. (circa 0.2 mole) of concentrated hydrochloric acid. Practically all passed into solution. The solution was filtered from a small quantity of suspended matter. To the filtrate was then added a solution of 20 g. (excess over 0.2 mole) of sodium cyanate in 200 cc. of water. After a slight delay a crystalline precipitate was produced, along with some evolution of gas. Finally, about 16 cc. more of concentrated hydrochloric acid was added. After 15 minutes the crystalline product was filtered off, washed well with water, and dried in air. Yield=21.0 g. This decomposed with gas evolution at 233–234° C. An additional 5 g. of product separated from the filtrate on standing overnight. Analysis of the original 21 g. of product gave the following:

| Analyses: | Percent |
|---|---|
| Nitrogen calculated | 25.2 |
| Nitrogen found | 24.3 |
| Sulfur calculated | 19.3 |
| Sulfur found | 19.3 |

(H) OCTANE SULFONYL SEMICARBAZIDE 97 g. (0.45 mole) of n-octane sulfonyl chloride (from sodium n-octane sulfonate and phosphorus pentachloride) was added to a mixture of 32 g. (1.0 mole) of hydrazine in 150 cc. of alcohol and 200 cc. of water, keeping the temperature of the stirred mixture below 40° C. After stirring for one hour 167 cc. 6 N hydrochloric acid (1.0 mole) was added. Then 109 g. (1.35 moles) of potassium cyanate in 150 cc. of water was added gradually. After stirring for one additional hour the mixture was acidified to pH 2 with hydrochloric acid. The mixture was filtered. Chilling of the filtrate gave a small amount of the sulfonyl semicarbazide which was added to that extracted later from the above filter cake. The main filter cake was extracted with sodium hydroxide solution and the alkaline extract treated with Norite, which removed most of the color. The mixture was filtered and the filtrate acidified with hydrochloric acid. The solid was filtered off (with some difficulty), reslurried in water and filtered again. The product when dried in a vacuum desiccator was obtained as fine white plates. Yield=28 g. A portion was recrystallized from 1:1 water-alcohol mix. The purified n-octane sulfonyl semicarbazide melted with decomposition at 182–183 C.

(I) ALPHA-TOLUENE SULFONYL SEMI-CARBAZIDE

Ten grams of sodium cyanate in water (50 cc.) was added to 10 g. of dihydrazine sulfate in 50 cc. of water. To the resulting solution was added 19.0 g. of alpha-toluene sulfonyl chloride. The mixture was stirred two hours. Then 8.0 g. of sodium carbonate in 50 cc. of water was added gradually (one hour). The mixture was stirred for an additional three hours and the product filtered off and washed with water. The solid product was then taken up in dilute sodium hydroxide solution, filtered from insolubles and the filtrate acidified with dilute sulfuric acid. The white crystalline product was filtered off, washed well with water and dried. The yield of alpha-toluene sulfonyl semicarbazide was 1.8 g. This melted with decomposition at 230° C.

(J) BETA-NAPHTHALENE SULFONYL SEMI-CARBAZIDE 22.6 g. (0.1 mole) of beta-naphthalene sulfonyl chloride was suspended in 200 cc. of ethanol and heated to dissolve. The solution was filtered from a small amount of insoluble matter, cooled some, and treated gradually with an excess (7 cc.) of hydrazine dissolved in 10 cc. of ethanol. The mixture became warm, and a white precipitate was produced. Finally, the mixture was warmed to complete solution and was rapidly filtered. Upon cooling the beta-naphthalene sulfonyl hydrazide crystallized out. It was filtered off, and the filter cake was transferred to a beaker and treated with a solution of 8.5 cc. (0.1 mole) of concentrated hydrochloric acid in 300 cc. of water. Ethanol was added in sufficient quantity to bring the hydrochloride into solution upon warming. The warm solution was filtered and then cooled. Potassium cyanate (16 g.) in 100 cc. of water was gradually added to the mix. The character of the crystalline material underwent a perceptible change. Finally, an excess of hydrochloric acid was added and the mixture stirred for a short time. The resulting product was filtered off, washed well with water, sucked fairly dry on a filter, and reslurried in ethanol. Upon drying, 9.0 g. of beta-naphthalene sulfonyl semicarbazide was obtained melting at 214° C. with gas evolution. This was analyzed:

N calculated for $C_{10}H_{11}SO_3N_3$: 15.8%. Found: 15.6%. S calculated: 12.05%. Found: 11.97%. Gas evolution found: 123 cc. per gram.

Note: Gas evolution for one mole of gas calculated—85 cc. per gram.

Gas evolution data

The amounts of gas released by the several sulfonyl semicarbazide preparations were determined by heating a weighed quantity of the compounds beyond their decomposition temperatures in the presence of a heat transfer medium (dioctyl phthalate). The volume of gas evolved was determined by difference in a mercury filled gas burette. The volumes of gas, converted to standard conditions (0° C. and 760 mm. pressure) produced by a number of sulfonyl semicarbazides, and, for comparison, by a sulfonyl hydrazide, are given in the following table:

| Compound | Cc. gas/gram | Moles gas per sulfonyl hydrazide group | Decomposition temperature, ° C. |
|---|---|---|---|
| Methane sulfonyl semicarbazide | 263 | 1.7 | 194 |
| Ethane sulfonyl semicarbazide | 216 | 1.6 | 156 |
| Octane sulfonyl semicarbazide | 117 | 1.3 | 182 |
| p,p'-Oxy bis-(benzene sulfonyl semicarbazide) | 145 | 1.37 | 213 |
| Benzene sulfonyl semicarbazide | 145 | 1.39 | 218 |
| p-Toluene sulfonyl semicarbazide | 143 | 1.47 | 236 |
| alpha-Toluene sulfonyl semicarbazide | 133 | 1.36 | 230 |
| Beta-naphthalene sulfonyl semicarbazide | 123 | 1.45 | 214 |
| 1,4-Butane bis-(sulfonyl semicarbazide) | 183 | 1.3 | 233 |
| p,p'-Oxy bis-(benzene sulfonyl hydrazide) (A commercial blowing agent) | 125 | 1.0 | 159 |

It can be seen that in the case of each of the sulfonyl semicarbazide compounds greater than one mole of gas is produced per sulfonyl semicarbazide group present in the molecule. This contrasts with the formation of one mole of gas in the case of a typical sufonyl hydrazide (as p,p'-oxy bis-(benzene sulfonyl hydrazide)). The increased gas production with my sulfonyl semicarbazides comprises an important advantage of these compounds as blowing agents.

In order to determine the effectiveness of sulfonyl semicarbazides as expanding agents for cellular polyethylene, one percent, by weight, of a number of the chemicals of the invention were incorporated into polyethylene on a two-roll mill at around 230° F. The chemicals were thoroughly blended into the plastic to ensure good dispersion of the blowing agent in the plastic matrix. The blends were then chilled (Dry Ice) and chopped into ⅜″ pellets and fed into a 1½″ extruder. The temperature varied within the extruder from 350° F. (barrel) to 375–400° F. (head) and 375–430° F. (die). The temperatures were adjusted at the various positions in the extruder to accommodate the decomposition characteristics of the blowing agent and to produce expansion of the plastic mass as it emerged from the die. Measurement of the density of the cooled stocks affords a convenient method of demonstrating the effectiveness of the blowing agents. The following data were obtained:

| Blowing agent | Die temperature, °F. | Density |
|---|---|---|
| None | 350 | .94 |
| Azodicarbonamide (A commercial blowing agent) | 350 | .50 |
| Benzene sulfonyl semicarbazide | 390 | .78 |
| p,p'-Oxy bis-(benzene sulfonyl semicarbazide) | 370 | .45 |
| p-Toluene sulfonyl semicarbazide | 430 | .53 |
| alpha-Toluene sulfonyl semicarbazide | 360 | .70 |
| Methane sulfonyl semicarbazide | 390 | .42 |
| Butane sulfonyl semicarbazide | 380 | .66 |
| Octane sulfonyl semicarbazide | 400 | .72 |
| Butane 1,4-bis-(sulfonyl semicarbazide) | 360 | .65 |

It is to be seen that each of the sulfonyl semicarbazide compounds is very effective in producing an expanded product. The density of the expanded plastic as measured in the experiment described above in most cases is lower than that obtained with a standard commercial blowing agent (azodicarbonamide). The density of the resin will vary with the gas-forming efficiency of the individual blowing agents as well as with other factors such as the visco-elastic properties of the resin at the processing temperatures and with the decomposition temperatures of the blowing agent.

I. *Sulfonyl semicarbazides as expanding agents in a synthetic rubber composition*

Several sulfonyl semicarbazides were tested as blowing agents in a synthetic rubber composition. The agents were incorporated into a composition indicated in the following recipe:

|  | Parts by weight |
|---|---|
| Rubbery butadiene-styrene copolymer (SBR) | 100.0 |
| High styrene-butadiene resin (Kralac A-EP) | 20.0 |
| p,p'-Di-octyl diphenylamine (Octamine) | 1.0 |
| Finely divided wood cellulose (Solka Floc) | 10.0 |
| p-Cumarone-indene resin (Cumar M.H. 2½) | 6.0 |
| Zinc oxide (Protox 268) | 5.0 |
| Stearic acid | 3.0 |
| Calcium silicate (Silene EF) | 25.0 |
| Titanium dioxide (Titanox A) | 5.0 |
| Hard clay (Suprex Clay) | 60.0 |
| Processing oil, naphthenic type (Circo light oil) | 10.0 |
| Petrolatum | 4.0 |
| Benzothiazole disulfide (MBTS) | 1.25 |
| Diphenyl guanidine (DPG) | 0.3 |
| Tetramethyl thiuram disulfide (TUEX) | 0.3 |
| Sulfur | 3.0 |
|  | 390.85 |

The ingredients listed above are designated as "the masterbatch."

|  | A | B | C | D | E |
|---|---|---|---|---|---|
| Masterbatch | 390.85 | 399.85 | 390.85 | 390.85 | 390.85 |
| p,p'-Oxy bis-(benzene sulfonyl semicarbazide) | 7.0 |  |  |  |  |
| Benzene sulfonyl semicarbazide |  | 7.0 |  |  |  |
| p-Toluene sulfonyl semicarbazide |  |  | 7.0 |  |  |
| Methane sulfonyl semicarbazide |  |  |  | 7.0 |  |
| p,p'-Oxy bis-(benzene sulfonyl hydrazide) (Celogen—a commercial blowing agent) |  |  |  |  | 7.0 |

The compositions (less the curatives and blowing agents) were mixed initially in a Banbury mixer. The curatives were then added along with the blowing agents on an open mill. After thorough mixing the stocks were placed in a mold and cured. The specific gravity of the uncured stock was 1.28. After curing for 15 minutes at 324° F. the sponge was removed hot to permit it to expand. Measurement of the gravity of the expanded stocks gave the following data:

Stock: Gravity
A _____ 0.60
B _____ 0.60
C _____ 0.68
D _____ 0.46
E _____ 0.48

The decrease in specific gravity from the 1.28 value (before cure) to the values shown demonstrate the effectiveness of the agents as blowing agents in the synthetic rubber composition.

(II) *Sulfonyl semicarbazides in expanded polypropylene*

In an experiment similar to that described for polyethylene, several sulfonyl semicarbazides were incorporated into polypropylene resin and the mixture extruded at temperatures sufficiently high to decompose the blowing agent and produce a cellular structure in the extruded plastic. Density measurements on the resulting cellular polypropylene are herewith shown:

| Blowing agent | Die temperature, °F. | Density |
|---|---|---|
| None | 400 | .87 |
| Azodicarbonamide | 400 | .53 |
| p-Toluene sulfonyl semicarbazide | 425 | .58 |
| p,p'-Oxy bis-(benzene sulfonyl semicarbazide) | 390 | .59 |
| 1,4-Butane bis-(sulfonyl semicarbazide) | 380 | .63 |

The present chemicals will find general use in gas expanding any polymeric material, especially those which are capable of setting to a normally solid state and having sufficient consistency and strength at the processing temperature (or to be enabled by virtue of the confining device) to retain the gas and preserve a cellular structure in the expanded product. The processing temperature will depend upon a number of factors including the nature of the polymeric material and its visco-elastic properties, upon the forming equipment being used and upon the nature of the end product desired. In general, for most effective results one must obtain in the polymeric material being expanded a consistency and tensile strength sufficient to retain the individual micropores of gas as discrete cells, preventing coalescence to an undesirable coarse cell structure. This may generally be attained in the case of thermosetting resins by adjustment of the rate and state of cure to give the composition the desired viscosity and strength at gas forming temperature. In the case of thermoplastic resins, the desired consistency and strength will generally be achieved by adjusting the temperature until the proper viscosity is obtained. As the gas forming temperature will vary with the particular sulfonyl semicarbazide compound selected and may change with the composition of the plastic mixture, it will be seen that the temperature employed may vary considerably with the particular application.

Among such polymeric materials, besides those heretofore given, is any type of rubber which is curable or vulcanizable to a solid state, exemplified by natural rubber, or synthetic rubber-like or rubbery polymers of diolefins such as butadiene or isoprene, or their copolymers with such as styrene or acrylonitrile, and butyl rubbers, polymerized halo-diolefins such as neoprene, polyvinyl chloride, polystyrene, etc.

The blowing agents are mechanically mixed with the polymeric materials and, if desired, other customary adjuvants, fillers, plasticizers, etc., may also be added, prior to heating the mixture to temperatures at which decomposition of the semicarbazides takes place. The amount of the blowing agent may vary from 0.1 to 20%, the quantity used depending upon the application and the density desired.

This application is a division of my copending application Serial No. 863,129, filed December 31, 1959, now U.S. Patent No. 3,152,176.

Having thus described my invention, what I claim and desire to protect by Letters Patent is:

1. A process of making gas-expanded products which comprises incorporating in a gas-expansible polymeric material selected from the group consisting of rubbers and synthetic resins, a sulfonyl semicarbazide in which the sulfonyl group is directly linked to a hydrocarbon radical selected from the group consisting of phenyl, lower alkyl phenyl, naphthyl, alkyls having from 1 to 10 carbon atoms, benzyl, alkylenes of not more than 10 carbon atoms per sulfonyl semicarbazide group an xylylene, and heating the mixture above the decomposition temperature of said semicarbazide.

2. A composition of matter comprising a gas-expansible polymeric material selected from the group consisting of rubbers and synthetic resins and a sulfonyl semicarbazide in which the sulfonyl group is directly linked to a hydrocarbon radical selected from the group consisting of phenyl, lower alkyl phenyl, naphthyl, alkyls having from 1 to 10 carbon atoms, benzyl, alkylenes of not more than 10 carbon atoms per sulfonyl semicarbazide group and xylylene.

References Cited by the Examiner

UNITED STATES PATENTS 3,152,176   10/1964   Hunter _____ 260—2.5

MURRAY TILLMAN, *Primary Examiner.*